Figures 1, 2:
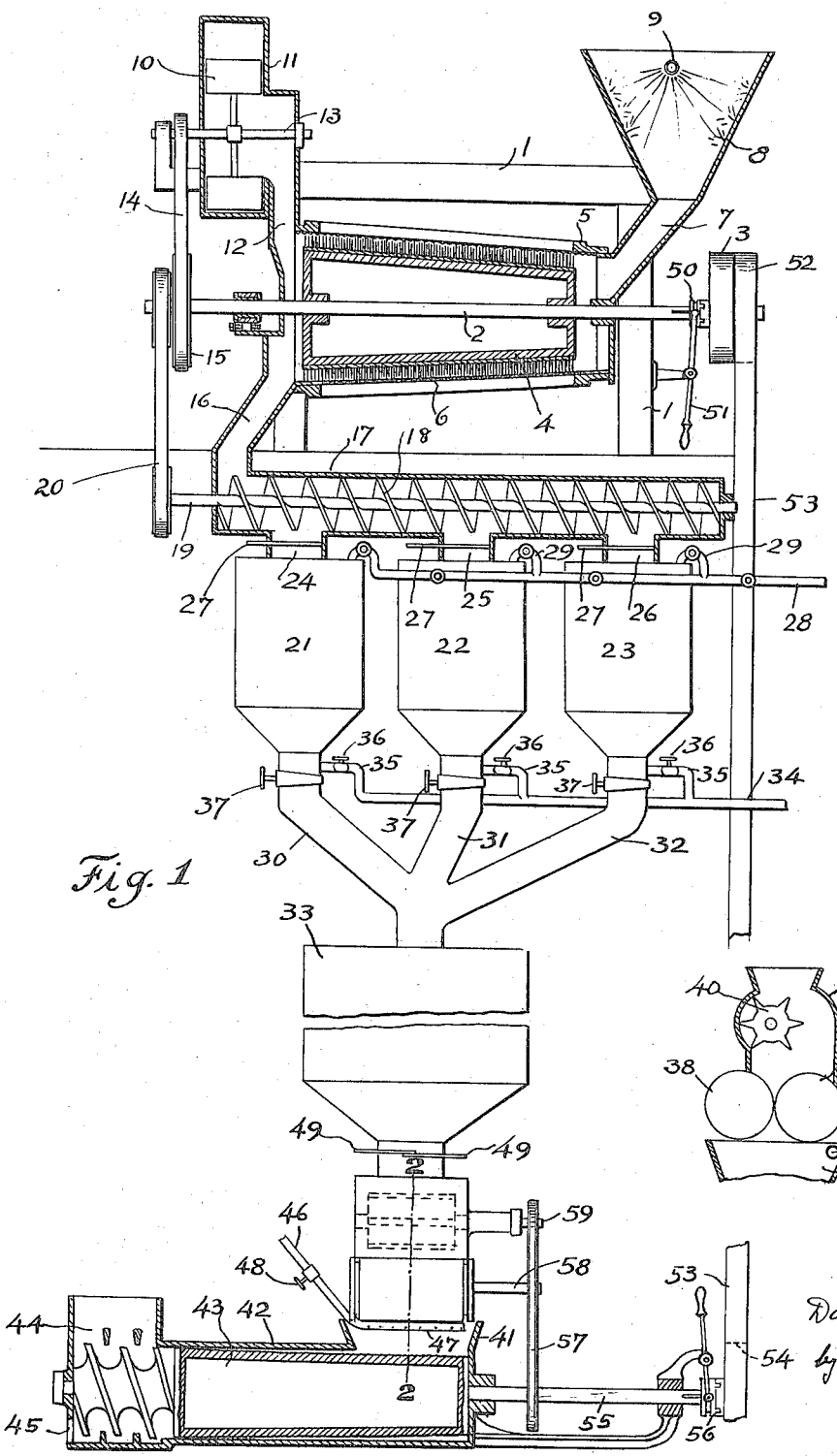

D. CHIDLOW.
PROCESS AND MACHINE FOR MAKING BREAD.
APPLICATION FILED JUNE 12, 1917.

1,255,293.    Patented Feb. 5, 1918.

Inventor
David Chidlow
by Rob. P. Hains,
Attorney

UNITED STATES PATENT OFFICE.

DAVID CHIDLOW, OF RIDGEFIELD, CONNECTICUT, ASSIGNOR TO JAMES F. STRACHAN AND WILLIAM S. STRACHAN, OF MONTREAL, QUEBEC, CANADA.

PROCESS AND MACHINE FOR MAKING BREAD.

1,255,293.　　　　Specification of Letters Patent.　　Patented Feb. 5, 1918.

Application filed June 12, 1917. Serial No. 174,213.

*To all whom it may concern:*

Be it known that I, DAVID CHIDLOW, a subject of King George V of Great Britain, residing at Ridgefield, county of Fairfield, and State of Connecticut, have invented an Improvement in Processes and Machines for Making Bread, of which the following description, in connection with the accompanying drawings, is a specification, like characters on the drawings representing like parts.

The invention to be hereinafter described relates to an improved process of, and a machine for forming bread of good, edible qualities, from whole grain.

It has heretofore been proposed to make bread or rather the dough from which the bread is baked, from whole grain, such as wheat, by steeping the whole grain in warm water a sufficient length of time to cause the germination of the grain, and then crushing the moist grain in a dough-mill so that the whole grain, including the skin, is converted into dough, which is set aside for a necessary length of time at a suitable temperature to permit the chemical action of the yeast inherent therein and to cause the dough to expand or rise.

The bread formed from the dough thus previously suggested, contains the skin of the grain which is a thin, paper-like cellular structure, and is practically indigestible. This skin forms the main medical objection to bread formed of whole grain, because it acts as an irritant and has no food value.

In a prior application filed by applicant, a process or method of making dough for bread was described and claimed, wherein the whole grain was first subjected to treatment for the removal of the skin without injuring the germinating property of the grain; then germinating the grain to the desired extent; and then crushing the germinated and skinned grain for the production of bread. This process thus described and claimed in the prior application, with an additional step therein, is contemplated to be carried into effect by the present invention which likewise includes, also, a machine for effecting the various operations upon the whole grain to convert such grain into dough.

In the accompanying drawings:—

Figure 1 is a side elevation, partly in section, of a machine adapted for the treatment of whole grain and effect its conversion into dough without the presence of the indigestible skin, and after the grain has been germinated to a desired extent; and Fig. 2 is a detail section on an enlarged scale, on the line 2—2 of Fig. 1.

In order that the whole grain may be peeled, that is, the outer skin removed from the grain without injuriously affecting the germinating property of the grain, applicant's invention contemplates that the grain be first treated by water a sufficient length of time to moisten the outer skin and cause it to swell or expand to some extent, and then submitting the grain to a rubbing action to remove the outer skin. This step in the process may be variously carried into effect, but as shown in the drawings, there is mounted upon a suitable framework 1 sustained upon a suitable support, a driving shaft 2 which may receive motion from any suitable source of power through a driving pulley 3. Mounted upon and rotatable with the shaft 2 is a tooth-covered cone 4, the teeth of which are of a character to non-injuriously operate upon the grain as the cone is revolved. Surrounding the cone 4 and suitably mounted upon the frame 1 is the casing 5 preferably provided with a reticulated or meshed fabric 6, such as wire cloth or the like, the construction being such that when the moistened grain is fed into the space between the fabric 6 and the cone 4, it will be subjected to a rubbing action of a character to remove the skin of the grain without injuring the particles of grain beneath or detracting from the germinating property of the grain.

Communicating with the space between the fabric 6 and the cone 4 is a chute 7 which communicates with a suitable reservoir 8 into which the grain may be fed from a suitable source. The grain fed into the reservoir 8 may have been previously moistened or a water supply pipe 9 may be employed to sufficiently wet the grain and effect moistening of the outer skin and its expansion to a suitable extent permitting the skin to be removed from the grain by the rubbing action of the teeth on the cone 4.

A large part of the smaller particles of skin taken from the grain will pass through the meshes of the fabric 6, but in order to remove the undesirable foreign matter from the grain before the next step in its treatment, there is provided a suction fan 10 carried by a suitable casing 11 which communicates through the passage 12 with the space between the cone 4 and the fabric 6, the construction being such that the air blast created by the fan will remove the foreign and lighter particles from the peeled grain, but not lift the grain itself.

The fan 10 is suitably mounted upon a shaft 13 carried by the casing and driven from a belt 14 operatively connecting the fan with the pulley 15 on the driving shaft 2.

Leading from the space between the cone 4 and the fabric 6 is a discharge chute 16 down which the peeled and clean grain travels to a conveyer for distribution to the germinating station. In the present instance of the invention, the conveyer comprises a casing 17 in which operates the screw 18 carried by the shaft 19 which is rotated by belt connection 20 with the driving shaft 2, substantially as indicated in Fig. 1.

Connected with the conveyer are a series of germinating tanks or reservoirs 21, 22 and 23, each having a separate valve-controlled connection 24, 25 and 26 with the conveyer. The valve-controlling connection between the conveyer and the germinating tanks may be of the sliding type as indicated at 27, the construction being such that by proper manipulation of the valves 27, any one of the germinating tanks 21, 22 or 23 may be placed in communication with the conveyer to receive therefrom a charge of peeled grain.

Obviously, the number of germinating tanks or reservoirs may be varied to suit the conditions of use, but in the present instance of the invention, three are shown. Each of the germinating tanks, however, is connected with a water supply pipe 28 by a branch pipe 29 and suitable valves or stop-cocks may be employed in the piping connections to control the flow of water into the germinating tanks.

When the skinned or peeled grain has been delivered to the germinating tanks or any one of them, a suitable amount of water is introduced into the tank or tanks at a desired temperature to start germination of the grain; and this germination of the grain is continued until the grain constituents have been modified to the desired extent. The action which takes place in the germination of the grain is well understood by those skilled in the art, and need not be described at this time. After the grain has been sufficiently germinated, it is to be crushed as contradistinguished from ground, to form a dough. To this end the germinating tanks 21, 22, 23 are each connected by conveyers 30, 31, 32, with a supply reservoir or tank 33. Before the grain is permitted to run into the supply tank or reservoir 33, the water in the germinating tank or tanks is drawn off. This may be effected through the drain pipe 34, branches 35 of which leading to the respective germinating tanks, are controlled by suitable hand valves or stop-cocks 36. Below the bottom of the germinating tanks, preferably, also, below the connection of the drain pipe 34 with the tanks, each of the tanks is provided with a grain-controlling valve 37, the construction being such that when the water has been drawn from the germinating tanks 21, 22 and 23, or any one of them, the grain-controlling valve 37 leading to that tank may be opened to permit the peeled and germinated grain to pass into the supply reservoir 33, from which it may be delivered in desired quantities to a crushing means for converting the peeled and germinated grain into dough.

Below the supply tank or reservoir 33 is the crushing means which, in the present instance of the invention, comprises a pair of preliminary crushing rolls 38 between which the grain delivered from the supply tank 33 into the hopper 39 may be passed by a suitably rotated stirring device 40, Fig. 2. Leading from the crushing rolls 38 is the hopper 41 which directs the material between the walls 42 of the casing and the rotatable crushing device 43. The walls of the casing and the co-acting walls of the crushing device 43 may progressively approach each other as indicated in Fig. 1, and be provided with suitably grooved portions to gradually feed the grain lengthwise of the casing and pass it into the open portion 44 of the casing. In the portion 44 of the casing, the grain will be found to have been sufficiently crushed and macerated to form the desired character of dough, and from the portion 44 the dough may be discharged from the opening 45.

If desired, salt, yeast, sugar, or any other substance may be fed to the dough in the portion 44 of the machine.

It is to be noted that in germinating, the grain will not absorb more than about from forty-four to fifty per cent. of water, and this is the general condition in which the grain will be found when the germination has reached the desired point. Inasmuch as during the process of crushing the germinated grain to form the dough the quantity of liquid or water going with the germinated grain will determine whether or not a proper character of dough shall be formed, it becomes necessary to accurately determine the amount of water or liquid additional to the amount absorbed by the grain in the germinating process, which shall be given to it at the crushing period of the operation. If there is too much water, the germinated grain will not be pulped or properly crushed into dough, but will slip past the crushing elements and be unfit for bread-making; and similarly, if not enough liquid or water is present with the germinated grain when it is crushed, the grain will not be properly treated by the crushing elements, and a proper dough will not result. It is therefore of primary importance as one of the features of the present invention, that after the grain has been peeled and germinated to the desired extent, that the water in which the grain was germinated be drawn off and the germinated grain then fed to the crushing means where a proper supply of liquid may be furnished in proper proportion, which is usually from fifteen to twenty-five per cent. of the weight of the grain.

To effect this introduction of proper amount of liquid or water when the grain is crushed to form the dough, the present invention provides a supply pipe 46, the end portion 47 of which may project into the crushing means below the crushing rolls 38, as one convenient location thereof, or such end 47 may project into some other portion of the crushing device, the construction being such, however, that as the germinated grain is crushed to form the dough, it shall be supplied water or liquid of from fifteen to twenty-five per cent. of the weight of the grain.

In order that the proper amount of liquid or water supply may be regulated, the supply pipe 46 is provided with a hand valve 48.

To control the supply of peeled, germinated grain fed to the crushing means, the supply reservoir 33 may be provided with suitable discharge controlling valves 49.

It is desirable at times to operate the grain-peeling means and the crushing means simultaneously, and at other times to run them independently. To this end, the driving shaft 2 for the peeling device is connected and disconnected to the driving element or pulley 3 by means of a clutch 50 which may be operated by a suitable handle 51, said clutch being splined to the driving shaft 2 and adapted to be operatively clutched with the driving element or pulley 3 which is constantly driven.

Mounted on the shaft 2 and rotatably connected with the driving pulley 3 is the pulley 52 which may be connected by a belt 53 with a pulley 54 mounted loosely on the shaft 55 of the crusher, a clutch 56 being provided for clutching the pulley 54 operatively to the shaft 55.

Mounted upon the shaft 55 is another pulley connected by a belt 57 to a pulley on the shaft 58 of one of the crushing rolls 38 and also connected operatively to a pulley on the shaft 59 of the agitator 40, the construction being such that the means for peeling the grain, germinating the grain, and crushing the peeled, germinated grain, may be simultaneously operating, or, when sufficient grain has been fed for the time being, the peeling means may be rendered inoperative by its clutch connection with the driving pulley 3, and the crushing means may be continued in operation to treat the grain already germinated in the tanks.

Various modifications may suggest themselves to those skilled in the art, but the machine herein described is found to be practical and efficient in operation, and to conveniently carry out the process or method hereinbefore described.

What is claimed is:—

1. The herein-described process of manufacturing dough from whole grain, which consists in removing the outer skin of the grain without injuring the germinating property of the grain, then germinating the naked or peeled grain to develop the germ, then separating the germinated grain from the liquid in which it was germinated, and crushing the grain in the presence of liquid substantially equal to from fifteen to twenty-five per cent. of the weight of the grain.

2. The herein-described process of manufacturing dough from whole grain, which consists in removing the outer skin of the grain without injuring the germinating property of the grain, then germinating the naked or peeled grain to develop the germ, then crushing the germinated naked or peeled grain, and adding liquid to the germinated grain as it is being crushed to form a dough.

3. In a machine for treating whole grain to form a dough, the combination of means for removing the outer skin of the grain without injuring the germinating property of the grain, a germinating tank or reservoir, means for transferring the naked or peeled grain to the germinating tank, grain crushing means to receive the naked or peeled grain after it has been germinated, and means for adding a liquid to the germinated grain to enable the grain crushing means to convert the germinated peeled grain into dough.

4. In a machine for treating whole grain to form a dough, the combination of means for removing the outer skin of the grain and separating the decorticated grain from the skins, a germinating tank or reservoir, means for transferring the naked or peeled grain to the germinating tank or reservoir, means for crushing the peeled grain after it has been germinated to the desired amount, a supply reservoir between the germinating tank and crushing means for delivering the germinated grain to the crushing means, and means for adding water to the germinated grain when delivered to the crushing means to enable the dough to be formed.

5. In a machine of the character described, the combination of means for decorticating whole grain to remove the outer skin, a tank or reservoir for germinating the grain after the skin has been removed, means for crushing the peeled grain after it has been germinated, connections between the germinating tank or reservoir and crushing means, and a liquid supply connected to the crushing means for injecting a suitable amount of liquid into the peeled germinated grain to insure the formation of dough by the crushing means.

6. In a machine for treating whole grain to form a dough, the combination with means for peeling and germinating the whole grain, of means for crushing or reducing the peeled germinated grain into a dough, and a water supply pipe connected to the crushing means for introducing a percentage of water into the grain to enable the crushing means to convert the germinated grain into dough.

7. In a machine for treating whole grain to form a dough, the combination with means for peeling and germinating the whole grain, of means for crushing or reducing the peeled germinated grain into a dough, a water supply pipe connected to the crushing means for introducing a percentage of water into the grain to enable the crushing means to convert the germinated grain into dough, and driving connections between the peeling means and crushing means.

8. In a machine of the character described, the combination of means for peeling whole grain, a plurality of germinating tanks, means for conveying the peeled grain from the peeling means to said tanks, a single supply reservoir connected to each of the germinating tanks, and crushing means for receiving germinated grain from the single reservoir and converting it into dough.

9. In a machine of the character described, the combination of means for peeling whole grain, a plurality of germinating tanks, means for conveying the peeled grain from the peeling means to said tanks, a single supply reservoir connected to each of the germinating tanks, crushing means for receiving germinated grain from the single reservoir and converting it into dough, and operating connections between the peeling means and crushing means enabling the said means to be simultaneously or alternately operated.

10. In a machine of the character described, the combination of means for peeling whole grain, a plurality of germinating tanks, a conveyer for carrying peeled grain from the peeling means to any one of said germinating tanks, means for selectively determining which of said tanks shall receive peeled grain from the conveyer, and grain-crushing means connected to each of said germinating tanks that germinated grain from any one of the tanks may be treated by the crushing means.

11. In a machine of the character described, the combination of means for peeling whole grain, a plurality of germinating tanks, a conveyer for carrying peeled grain from the peeling means to any one of said germinating tanks, means for selectively determining which of said tanks shall receive peeled grain from the conveyer, grain-crushing means connected to each of said germinating tanks that germinated grain from any one of the tanks may be treated by the crushing means, and a liquid supply pipe for delivering liquid to the crushing means to enable the germinated grain to be converted into dough.

In testimony whereof, I have signed my name to this specification.

DAVID CHIDLOW.